US010290929B2

(12) United States Patent
Park et al.

(10) Patent No.: US 10,290,929 B2
(45) Date of Patent: May 14, 2019

(54) ELECTRICALLY SCANNED TACAN ANTENNA

(71) Applicant: KOREA AIRPORTS CORPORATION, Seoul (KR)

(72) Inventors: Sang Jin Park, Incheon (KR); Yong Gyu Choi, Goyang-si (KR); Su Kyung Kim, Incheon (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 431 days.

(21) Appl. No.: 15/155,189

(22) Filed: May 16, 2016

(65) Prior Publication Data
US 2016/0261033 A1    Sep. 8, 2016

Related U.S. Application Data

(63) Continuation of application No. PCT/KR2014/011185, filed on Nov. 20, 2014.

(30) Foreign Application Priority Data

Nov. 22, 2013  (KR) .......................... 10-2013-0143160

(51) Int. Cl.
*H01Q 1/28*        (2006.01)
*H01Q 3/44*        (2006.01)
(Continued)

(52) U.S. Cl.
CPC ................ *H01Q 1/28* (2013.01); *G01S 1/02* (2013.01); *H01Q 3/446* (2013.01); *H01Q 5/385* (2015.01); *H01Q 25/00* (2013.01); *H01Q 1/42* (2013.01)

(58) Field of Classification Search
CPC .. H01Q 1/28; H01Q 1/42; H01Q 3/44; H01Q 3/446; H01Q 5/378; H01Q 5/385; H01Q 25/00
See application file for complete search history.

(56) References Cited

U.S. PATENT DOCUMENTS

| 3,560,978 A | 2/1971 | Himmel et al. |
| 3,950,753 A | 4/1976 | Chisholm |
| (Continued) | | |

FOREIGN PATENT DOCUMENTS

| KR | 20010073723 | 8/2001 |
| KR | 20060016092 | 2/2006 |
| (Continued) | | |

OTHER PUBLICATIONS

International Search Report—PCT/KR2014/011165 dated Dec. 5, 2014.
(Continued)

*Primary Examiner* — Hoang V Nguyen
(74) *Attorney, Agent, or Firm* — Cantor Colburn LLP

(57) ABSTRACT

An electrically scanned TACAN antenna is provided. To elaborate, the electrically scanned TACAN antenna includes a reflection plate; a monopole antenna provided on an upper surface of the reflection plate and configured to omnidirectionally radiate a signal; multiple parasitic radiators arranged around the monopole antenna and configured to operate as reflectors that reflect the signal or directors that direct the signal; and a controller configured to control parasitic radiators operating as the reflectors to operate as the directors and some parasitic radiators among parasitic radiators operating as the directors to operate as the reflectors at every predetermined timing and controls an order to be the some parasitic radiators to be changed according to a preset sequence.

6 Claims, 15 Drawing Sheets

(51) Int. Cl.
*G01S 1/02* (2010.01)
*H01Q 25/00* (2006.01)
*H01Q 5/385* (2015.01)
*H01Q 1/42* (2006.01)

(56) References Cited

U.S. PATENT DOCUMENTS

| | | | |
|---|---|---|---|
| 4,700,197 A | 10/1987 | Milne | |
| 5,767,807 A * | 6/1998 | Pritchett | H01Q 3/24 342/374 |
| 6,127,987 A * | 10/2000 | Maruyama | H01Q 1/36 343/824 |
| 2002/0158798 A1 | 10/2002 | Chiang et al. | |

FOREIGN PATENT DOCUMENTS

| | | |
|---|---|---|
| KR | 100958846 | 5/2010 |
| KR | 20130112518 | 10/2013 |

OTHER PUBLICATIONS

European Search Report—European Application No. 14863533.7, dated Jun. 20, 2017, citing US 3 560 978, US 2002/158798, US 3 950 753 and US 4 700 197.

* cited by examiner

COCKPIT DASHBOARD

ELECTRICALLY SCANNED TACAN ANTENNA

CROSS-REFERENCE TO RELATED APPLICATION

This application is a continuation of PCT Patent Application No. PCT/KR2014/011185 filed on Nov. 20, 2014, which claims priority to and the benefit of Korean Patent Application No. 10-2013-0143160 filed on Nov. 22, 2013, and the entire disclosures of which are incorporated herein by reference.

TECHNICAL FIELD

The present disclosure relates to an electrically scanned TACAN (Tactical Air Navigation) antenna, and more particularly, to a TACAN antenna configured to electrically generate a signal required to calculate azimuth information in an airplane.

BACKGROUND

A TACAN antenna system is a special apparatus configured to supply azimuth information and distance information to an airplane to accurately and safely guide the airplane to a desired place.

FIG. 1 is a diagram provided to explain a general TACAN antenna system.

A fixed or mobile TACAN antenna including a transponder is located at a ground station 10, an airport, or a specific location, and can receive a query signal within a predetermined frequency band for use from an airplane 20. The TACAN antenna which received the query signal may radiate a specific signal. Then, the airplane 20 may receive the specific signal and calculate azimuth information (0° to 360°) relative to the ground station 10 and distance information with respect to the ground station 10. In the airplane 20, azimuth information 22 of 225° and distance information 23 of 120 NMI can be checked through a dashboard 21 illustrated in FIG. 1.

Meanwhile, FIG. 2 is a diagram provided to explain a mechanically scanned TACAN antenna according to the prior art.

A mechanically scanned TACAN antenna 30 according to the prior art as illustrated in FIG. 2 has an outer shape in which an openable radome 31 covers a lower support 32. If the radome 31 is removed, a rotatable circular implement 32 with a parasitic radiator bonded thereto is arranged. The circular implement 32 generates an amplitude-modulated radiation pattern while being connected to a 900 rpm DC motor and rotated.

The mechanically scanned TACAN antenna uses the DC motor. Therefore, the motor needs to be regularly replaced. Further, at the time of replacement, it is inconvenient to separate the relevant components from the motor, and vibrations and noises may be generated.

Meanwhile, Korean Patent No. 10-0958846 (entitled "Antenna parasitic element and broadband omni antenna") discloses a technology relating to a broadband omni antenna including a high frequency/low frequency monopole element and high frequency/low frequency parasitic elements symmetrically formed on left and right sides of the high frequency/low frequency monopole element.

DISCLOSURE OF THE INVENTION

Problems to be Solved by the Invention

The present disclosure is provided to solve the above-described problems of the prior art. Some exemplary embodiments of the present disclosure provide an electrically scanned TACAN antenna configured to generate an omnidirectional amplitude-modulated radiation pattern required to calculate azimuth information in an airplane.

Further, some exemplary embodiments of the present disclosure provide an electrically scanned TACAN antenna which can be used semipermanently and in which a defective parasitic radiator can be easily replaced since a semiconductor device is used instead of a motor.

However, problems to be solved by the present disclosure are not limited to the above-described problems. There may be other problems to be solved by the present disclosure.

Means for Solving the Problems

According to an aspect of the present disclosure, there is provided an electrically scanned TACAN antenna. The electrically scanned TACAN antenna may include a reflection plate; a monopole antenna provided on an upper surface of the reflection plate and configured to omnidirectionally radiate a signal; multiple parasitic radiators arranged around the monopole antenna and configured to operate as reflectors that reflect the signal or directors that direct the signal; and a controller configured to control parasitic radiators operating as the reflectors to operate as the directors and some parasitic radiators among parasitic radiators operating as the directors to operate as the reflectors at every predetermined timing and controls an order to be the some parasitic radiators to be changed according to a preset sequence.

Effects of the Invention

According to each of the above-described exemplary embodiments of the present disclosure, if an electrically scanned TACAN antenna is used, it is possible to semipermanently and accurately generate an amplitude-modulated composite (overlap) signal unlike a mechanically scanned TACAN antenna using a motor and also possible to achieve no noise and no vibration with saving of maintenance cost.

Further, according to the present disclosure, it is possible to compose a 15 Hz amplitude-modulated radiation pattern and a 135 Hz amplitude-modulated radiation pattern by electrical rotation conforming to MIL-STD-291C standard or another standard equivalent thereto and radiate the composed radiation pattern to a surrounding space. Further, a neighboring airplane can receive the amplitude-modulated radiation pattern and obtain azimuth information and thus accurately and safely move to a destination.

MODE FOR CARRYING OUT THE INVENTION

Figure 1:
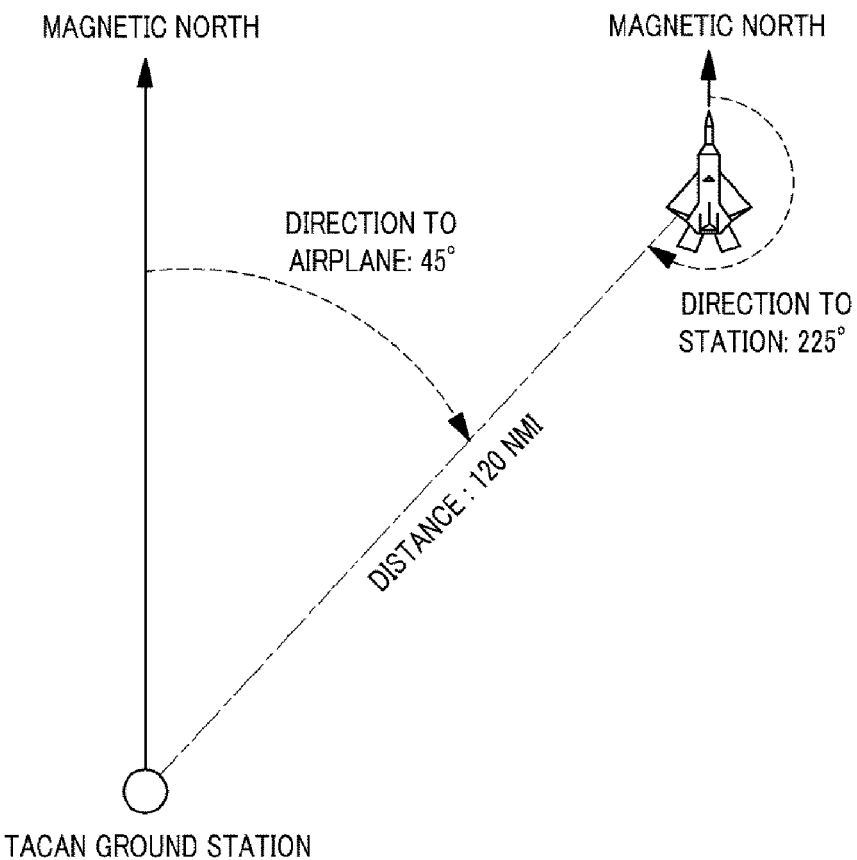
FIG. 1 is a diagram provided to explain a general TACAN antenna system.
Figure 1:
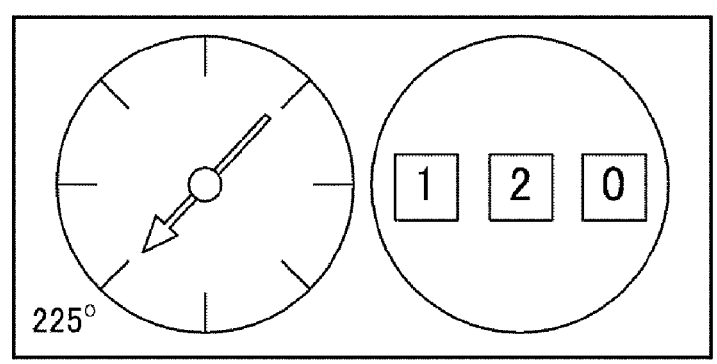
Figure 2:
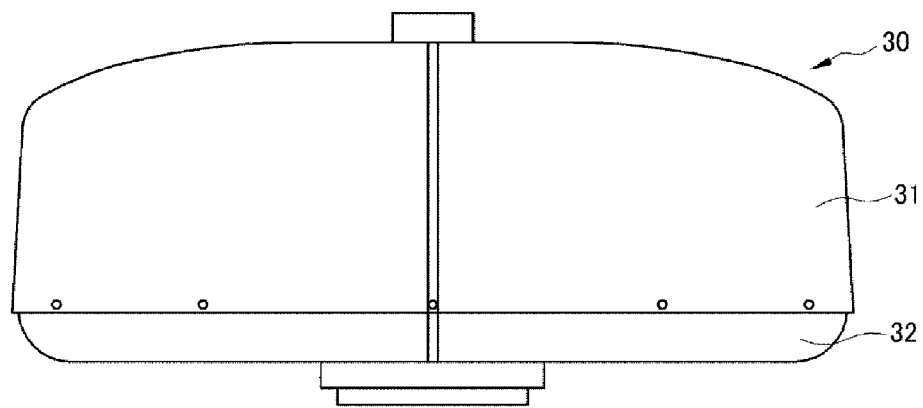
FIG. 2 is a diagram provided to explain a mechanically scanned TACAN antenna according to the prior art.
Figure 2:
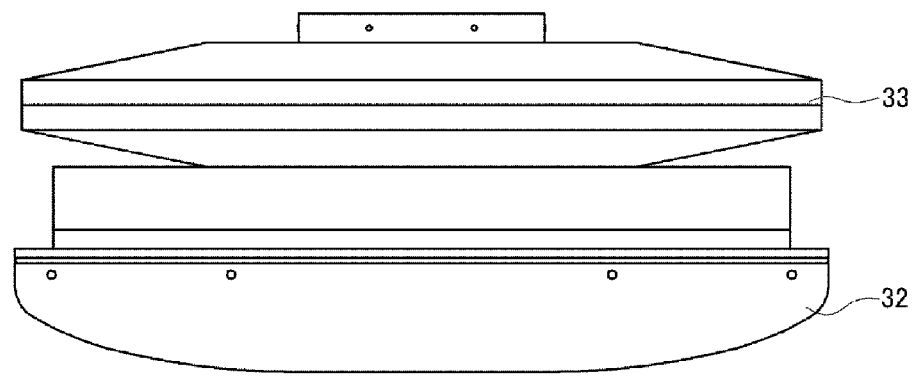

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "on" that is used to designate a position of one element with respect to another element includes both a case that the one element is adjacent to the another element and a case that any other element exists between these two elements.

Hereinafter, the exemplary embodiments of the present disclosure will be described in detail with reference to the accompanying drawings. However, the concept of the present disclosure is not limited thereto, but other exemplary embodiments can be easily conceived by supplying, modifying, deleting, or adding components within the scope of the same concept of the present disclosure and are also included within the scope of the present disclosure.

<Each Component of Electrically Scanned TACAN Antenna>

Figure 3:
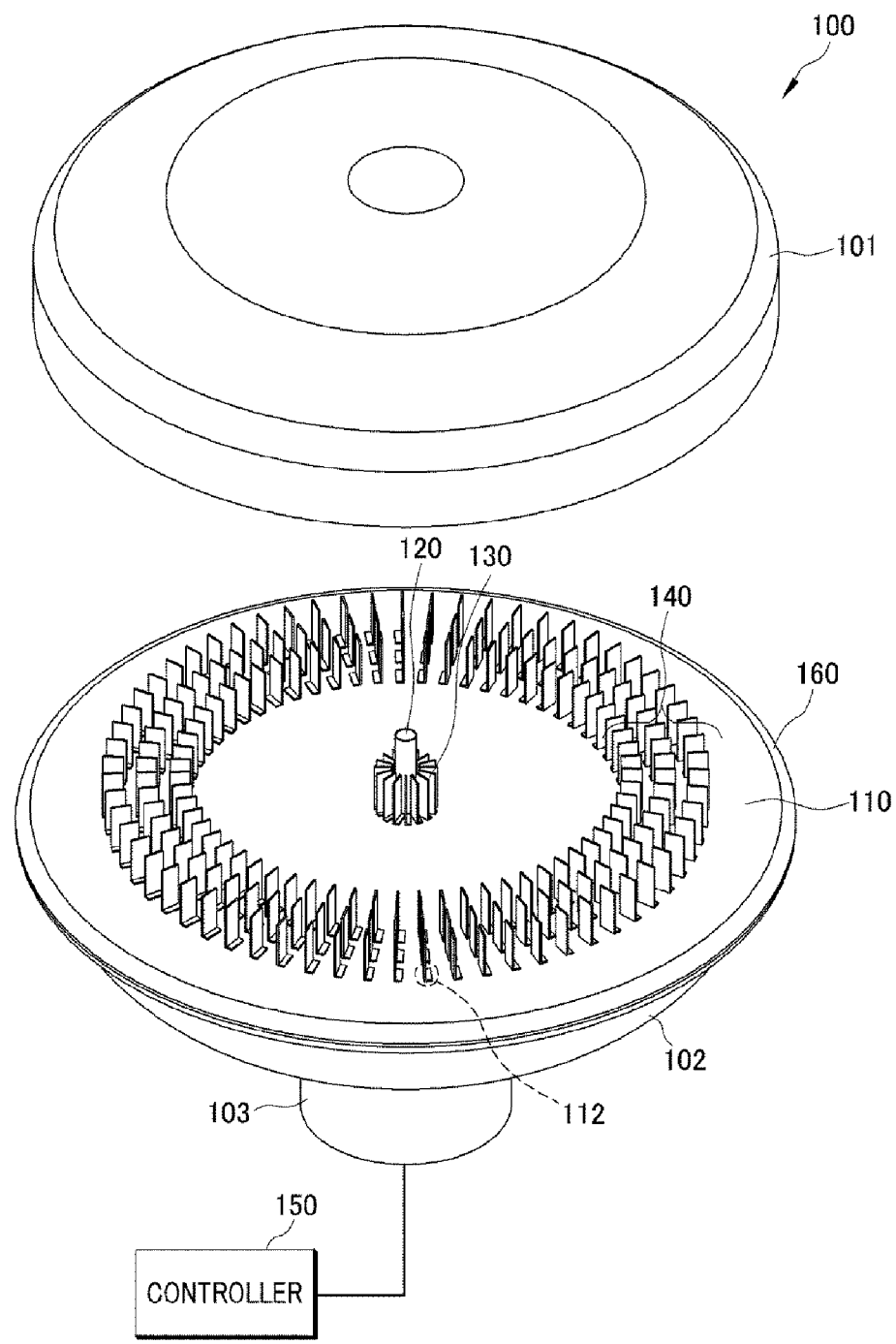
FIG. 3 is a diagram provided to explain a configuration of an electrically scanned TACAN antenna according to an exemplary embodiment of the present disclosure.

FIG. 3 is a diagram provided to explain a configuration of an electrically scanned TACAN antenna according to an exemplary embodiment of the present disclosure.

An electrically scanned TACAN antenna 100 may generate an amplitude-modulated radiation pattern of an omnidirectional radiation pattern radiated from a main monopole antenna 120 arranged at the center by electrical rotation of parasitic radiators 130 and 140 arranged around the monopole antenna 120.

The electrically scanned TACAN antenna 100 radiates the amplitude-modulated signal to be carried on synchronized north reference signal and auxiliary reference signal. An airplane may receive the radiated signal and calculate azimuth information.

For reference, a TACAN antenna has a broad frequency range for use from 962 MHz to 1213 MHz. Further, in case of using the TACAN antenna, in order to accurately and safely guide an airplane to a location intended by a user, a standard for 15 Hz or 135 Hz amplitude modulation needs to satisfy 21%±9 and an azimuth error needs to satisfy less than ±1 according to the MIL-STD-291C standard.

To be specific, the electrically scanned TACAN antenna 100 includes a reflection plate 110, the monopole antenna 120, the multiple parasitic radiators 130 and 140, a controller 150, and a water-proof gasket 160. The electrically scanned TACAN antenna 100 may further include an upper cover 101 configured to protect internal components, a lower member configured to support the reflection plate 110, and a level control unit 103 provided under the lower member 102 and configured to contribute to level control of the electrically scanned TACAN antenna 100.

The reflection plate 110 may have a flat circular plate shape, but a shape or size thereof is not particularly limited. A surface of the reflection plate 110 may be coated with a material suitable for reflection of a radiation signal, and an edge of the reflection plate 110 may be covered with the water-proof gasket 160 for waterproofing.

Further, each of the parasitic radiators 130 and 140 may be implemented on a printed circuit board (PCB). On an upper surface of the reflection plate 110, a connector 112 which can be connected to or disconnected from one end of the PCB may be provided and fixed.

The monopole antenna 120 is provided on the upper surface of the reflection plate 110 and configured to omnidirectionally radiate a signal. If the reflection plate 110 has a circular plate shape, the monopole antenna 120 may be extended from the center of the circular plate in a vertical axis direction of the reflection plate 110.

Figure 4A:
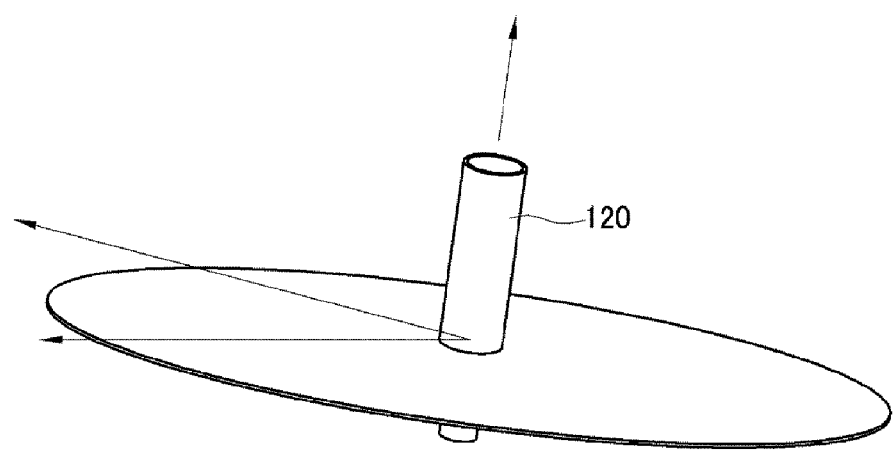
FIG. 4A is a diagram provided to explain a monopole antenna illustrated in FIG. 3.
Figure 4B:
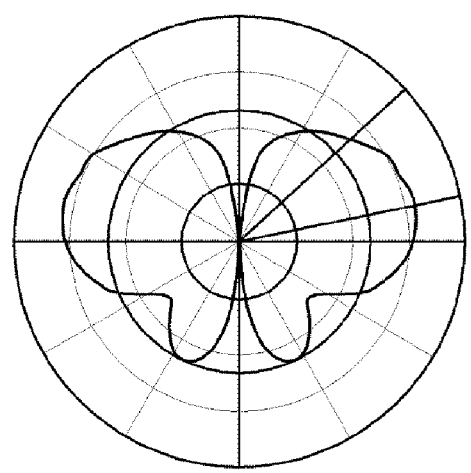
FIG. 4B is a diagram provided to explain a monopole antenna illustrated in FIG. 3.

FIG. 4A and FIG. 4B are diagrams provided to explain a monopole antenna illustrated in FIG. 3.

The monopole antenna 120 as depicted in FIG. 4A receives a RF signal from a TACAN transponder and omnidirectionally radiates the received RF signal. A radiation pattern of the omnidirectionally radiated RF signal is as shown in FIG. 4B.

The multiple parasitic radiators 130 and 140 are arranged around the monopole antenna 120 and operate as reflectors that reflect a signal radiated from the monopole antenna 120 or directors that direct the signal.

Figure 5A:
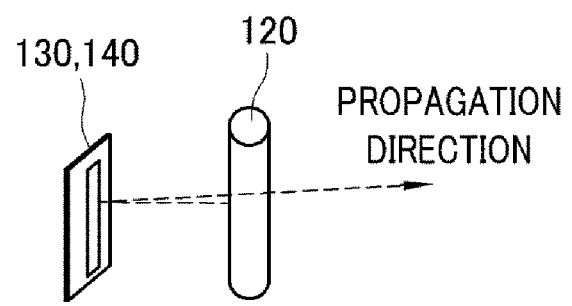
FIG. 5A is a diagram provided to explain a reflecting operation of a parasitic radiator illustrated in FIG. 3.
Figure 5B:
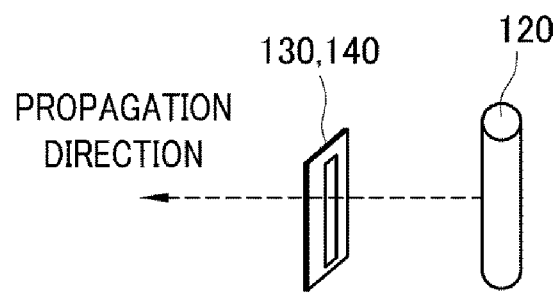
FIG. 5B is a diagram provided to explain a directing operation of the parasitic radiator illustrated in FIG. 3.

FIG. 5A is a diagram provided to explain a reflecting operation of a parasitic radiator illustrated in FIG. 3, and FIG. 5B is a diagram provided to explain a directing operation of the parasitic radiator illustrated in FIG. 3.

Some of the multiple parasitic radiators 130 and 140 perform an operation as reflectors that reflect a signal, and the others perform an operation as directors that direct the signal. That is, as illustrated in FIG. 5A, a RF signal radiated from the monopole antenna 120 may be reflected by some parasitic radiators 130 and 140 operating as reflectors and thus radiated in a direction different from or substantially opposite to an initial progress direction. Further, as illustrated in FIG. 5B, a RF signal radiated from the monopole antenna 120 may pass through the other parasitic radiators 130 and 140 operating as directors and thus may be radiated in an initial progress direction.

Herein, each of the multiple parasitic radiators 130 and 140 may operate as a reflector or a director depending on a state of connection to the reflection plate 110.

According to an exemplary embodiment, the parasitic radiators 130 may be circularly arranged at a predetermined distance from each other on a first concentric circle around a location of the monopole antenna 120. Further, the parasitic radiators 140 may be circularly arranged at a predetermined distance from each other on a second concentric circle, having a different radius from the first concentric circle, around the location of the monopole antenna 120. Herein, the radius of the second concentric circle may be set to be longer than that of the first concentric circle.

If 16 parasitic radiators 130 are arranged on the first concentric circle, any one of the 16 parasitic radiators 130 may reflect a signal. Herein, a parasitic radiator to reflect a signal may be changed at every predetermined timing according to a preset sequence. Further, if 63 parasitic radiators 140 are arranged on the second concentric circle, 9 parasitic radiators equally spaced from each other among the 63 parasitic radiators 140 may radiate a signal. Herein, 9 parasitic radiators to reflect a signal may be changed at every predetermined timing according to a preset sequence.

In order to accurately and stably generate an amplitude-modulated radiation pattern to be described later, the radiuses of the first concentric circle and the second concentric circle, a distance between the first concentric circle and the second concentric circle, a distance between the parasitic radiators 130 arranged on the first concentric circle, and a distance between the parasitic radiators 140 provided on the second concentric circle may be determined considering various preset factors.

According to another exemplary embodiment, the parasitic radiators 130 and 140 are circularly arranged at a predetermined distance from each other on donut-shaped first area and second area having concentricity with a location of the monopole antenna 120. Herein, the parasitic radiators 130 on the first area and the parasitic radiators 140 on the second area may be arranged in two or more rows in each column. Further, the second area may be farther spaced from the monopole antenna 120 than the first area.

If 16 parasitic radiators 130 are arranged in 2 rows on the first area, parasitic radiators arranged in any column among the 16 parasitic radiators 130 may reflect a signal. Herein, a column for parasitic radiators to reflect a signal may be changed at every predetermined timing according to a preset sequence. Further, if 63 parasitic radiators 140 are arranged in 3 rows on the second area, parasitic radiators arranged in columns equally spaced from each other may reflect a signal. Herein, columns for parasitic radiators to reflect a signal may be changed at every predetermined timing according to a preset sequence.

In order to accurately and stably generate an amplitude-modulated radiation pattern to be described later, respective distances of the first area and the second area from the monopole antenna 120, a distance between the first area and the second area, a distance between the parasitic radiators 130 arranged on the first area, and a distance between the parasitic radiators 140 provided on the second area may be determined considering various factors.

Details of the "amplitude-modulated radiation pattern" generated by the multiple parasitic radiators 130 and 140 that reflect or direct a signal radiated from the monopole antenna 120 will be described later.

Referring to FIG. 3 again, the controller 150 controls some parasitic radiators operating as reflectors at every predetermined timing to operate as directors, and controls some parasitic radiators operating as directors to operate as reflectors. Further, the controller 150 controls an order to be the some parasitic radiators to be changed according to a preset sequence. Herein, the predetermined timing may be very precisely set in advance to satisfy the MIL-STD-291C standard for TACAN antenna or an updated standard equivalent thereto.

According to an exemplary embodiment, the controller 150 may control a parasitic radiator operating as a director among the 16 parasitic radiators 130 arranged on the first concentric circle to operate as a reflector every $1/15$ second. Further, the controller 150 may control 9 parasitic radiators operating as directors and equally spaced from each other among the 63 parasitic radiators 140 arranged on the second concentric circle to operate as reflectors every $1/15$ second.

Further, the controller 150 may control the parasitic radiator on the first concentric circle to be changed in a clockwise direction according to a sequence of arrangement on the first concentric circle. Furthermore, the controller 150 may control the 9 parasitic radiators on the second concentric circle to be changed in the clockwise direction according to a sequence of arrangement on the second concentric circle. Thus, in the electrically scanned TACAN antenna 100, some parasitic radiators that reflect a signal may generate 15 Hz and 135 Hz amplitude-modulated composite (overlap) radiation patterns by electrical rotation.

According to another exemplary embodiment, the controller 150 may control parasitic radiators (i.e., 2 parasitic radiators in total) arranged in 1 column and operating as directors among 32 (i.e., 16*2) parasitic radiators 130 arranged in 2 rows on the first area to operate as reflectors every $1/15$ second. Further, the controller 150 may control parasitic radiators (i.e., 27 parasitic radiators in total) arranged in 9 columns and operating as directors equally spaced from each other among 189 (i.e., 63*3) parasitic radiators 140 arranged in 3 rows on the second area to operate as reflectors every $1/15$ second.

Further, the controller 150 may control the parasitic radiator in the 1 column on the first area to be changed in the clockwise direction according to a sequence of arrangement on the first area. Furthermore, the controller 150 may control the parasitic radiators in the 9 columns on the second area to be changed in the clockwise direction according to a sequence of arrangement on the second area. Thus, in the electrically scanned TACAN antenna 100, some parasitic radiators that reflect a signal may generate 15 Hz and 135 Hz amplitude-modulated composite (overlap) radiation patterns by electrical rotation.

However, even if parasitic radiators are arranged in the same column, each parasitic radiator may have a different length and a different radiation pattern depending on a row in which the parasitic radiator is arranged. That is, a TACAN antenna has a broad frequency range for use, and an electrical TACAN antenna may generate a signal having a discrete wave form rather than a continuous wave form and thus need to be controlled more precisely.

Therefore, the controller 150 may control parasitic radiators arranged in 1 column and operating as directors among parasitic radiators arranged in 2 rows on the first area to operate as reflectors at every predetermined timing, and also control a parasitic radiator arranged in any one row among the parasitic radiators arranged in the 1 column to operate in any one of two previously divided frequency bands within the frequency range for use of the TACAN antenna.

For example, in any one of the two previously divided frequency bands, a parasitic radiator arranged in the outer row in the same column on the first area may operate as a reflector and a parasitic radiator arranged in the inner row may operate as a director. Herein, 16 parasitic radiators may be arranged in each of 2 rows on the first area.

Further, the controller 150 may control parasitic radiators arranged in 9 columns and operating as directors equally spaced from each other among parasitic radiators arranged in 3 rows on the second area to operate as reflectors at every predetermined timing, and also control parasitic radiators arranged in any one row among the parasitic radiators arranged in the 9 columns to operate in any one of three previously divided frequency bands within the frequency range for use of the TACAN antenna.

For example, in any one of the three previously divided frequency bands, a parasitic radiator arranged in the outermost row in the same column on the second area may operate as a reflector and parasitic radiators respectively arranged in the middle row and the innermost row may operate as directors. Herein, 63 parasitic radiators may be arranged in each of 3 rows on the second area.

Details thereof will be described later.

Moreover, the controller 150 control a forward bias to be applied to a PIN diode connected to some parasitic radiators and a backward bias to be applied to a PIN diode connected to a parasitic radiator operating as a reflector at every predetermined timing. That is, a reflector operation and a director operation of the parasitic radiators 130 and 140 may be switched by controlling a bias to be applied to a PIN diode connected to each parasitic radiator.

Also, the controller 150 may include multiple switching elements each connected to a PIN diode, and may use the switching elements to switch a bias to be applied to the PIN diode at every predetermined timing.

Further, together with the level control unit 103 and a power supply unit (not illustrated), the controller 150 may be located under the reflection plate 110 and may be connected to each of the parasitic radiators 130 and 140.

Hereinafter, a result of electrical rotation of some parasitic radiators that reflect a signal will be described with reference to the drawings.

One of main functions of the TACAN antenna is to supply bearing information to an airplane. Thus, the electrically scanned TACAN antenna 100 according to an exemplary embodiment of the present disclosure composes a 15 Hz amplitude-modulated radiation pattern and a 135 Hz amplitude-modulated radiation pattern by electrical rotation conforming to the MIL-STD-291C standard or another standard equivalent thereto and radiates the composed radiation pattern to a surrounding space. Accordingly, an airplane can receive the amplitude-modulated radiation pattern and obtain azimuth information.

<Generation of 15 Hz Amplitude-Modulated Radiation Pattern>

Figure 6:
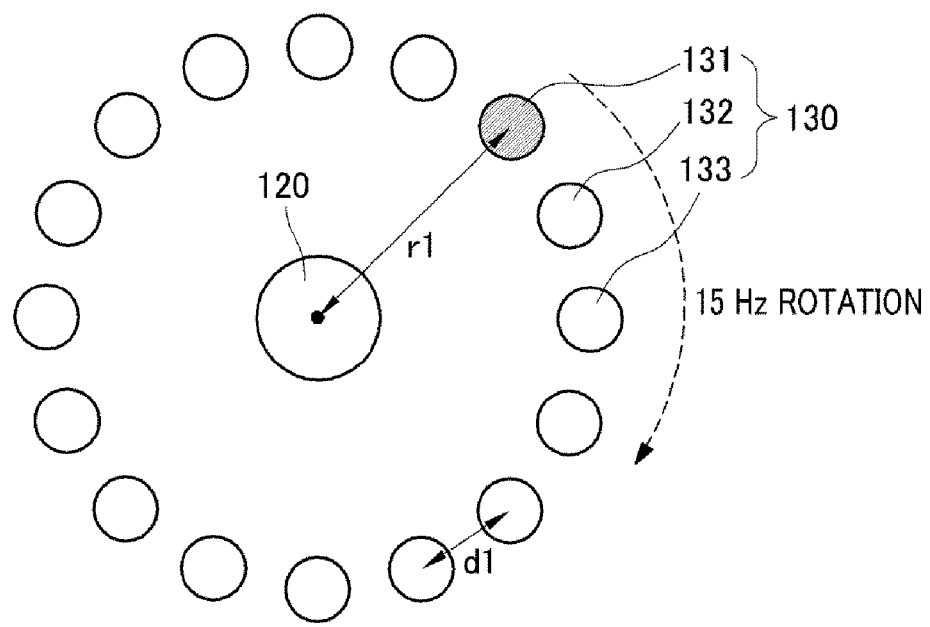
FIG. 6 is a diagram provided to explain an example in which parasitic radiators are arranged on a first concentric circle around a location of a monopole antenna.
Figure 7:
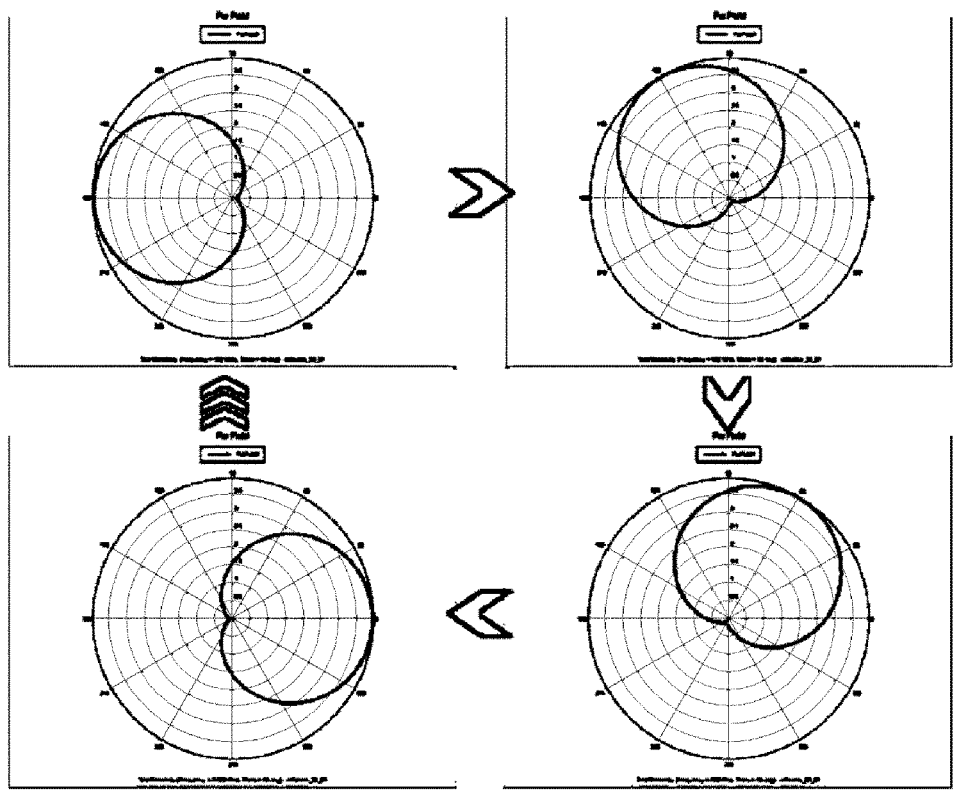
FIG. 7 is a diagram showing a radiation pattern caused by a change of a parasitic radiator that reflects a signal among the parasitic radiators illustrated in FIG. 6.

FIG. 6 is a diagram provided to explain an example in which parasitic radiators are arranged on a first concentric circle around a location of a monopole antenna, and FIG. 7 is a diagram showing radiation patterns caused by a change of some parasitic radiators that reflect a signal among the parasitic radiators illustrated in FIG. 6.

According to an exemplary embodiment, as shown in FIG. 6, 16 parasitic radiators 130 are circularly arranged at a predetermined distance d1 from each other on a line of the first concentric circle. Herein, the first concentric circle has a center with the location of the monopole antenna 120 and has a radius r1.

FIG. 6 illustrates that a first parasitic radiator 131 among the multiple parasitic radiators 130 operates as a reflector to reflect a signal radiated from the monopole antenna 120 and the other parasitic radiators 130 including second and third parasitic radiators 132 and 133 operate as directors to direct the signal.

That is, if 16 parasitic radiators 130 are arranged on the first concentric circle, any one of the parasitic radiators may reflect the signal and the other 15 parasitic radiators may direct the signal.

Herein, the controller 150 may control a parasitic radiator to operate as a reflector among the multiple parasitic radiators 130 to be changed in the clockwise direction according to a sequence of arrangement on the first concentric circle. Further, the controller 150 may control the change to be performed every $\frac{1}{15}$ second.

For example, as illustrated in FIG. 6, the controller 150 controls the first parasitic radiator 131 operating as a reflector to operate as a director and also controls any one of the parasitic radiators operating as directors to operate as a reflector. Herein, the one parasitic radiator changed to operate as a reflector may be the second parasitic radiator 132 arranged subsequent to the first parasitic radiator 131 in the clockwise direction on the first concentric circle. Further, the controller 150 may control some of the parasitic radiators 130 to be changed to directors or reflectors at a predetermined timing t1. Furthermore, the controller 150 may control the second parasitic radiator 132 to operate as a director and also control the third parasitic radiator 133 subsequently arranged in the clockwise direction to operate as a reflector at a subsequent timing t2.

Under the control of the controller 150 as such, a sequence of some parasitic radiators to operate as reflectors is electrically rotated at every predetermined timing. Therefore, a signal radiated from the monopole antenna 120 is spread to a space in a 15 Hz amplitude-modulated radiation pattern as shown in FIG. 7.

According to another exemplary embodiment, 32 parasitic radiators 130 may be circularly arranged at a predetermined distance from each other on the donut-shaped first area having concentricity with the location of the monopole antenna 120. Herein, 16 pairs of the parasitic radiator 130 may be arranged in 2 rows on the first area. Each parasitic radiator 130 may have a different length and a different radiation pattern depending on a row in which the parasitic radiator 130 is arranged.

Herein, the controller 150 may change parasitic radiators arranged in 1 column and operating as directors among the parasitic radiators arranged in 2 rows on the first area to operate as reflectors at every predetermined timing. Further, the controller 150 may control a parasitic radiator arranged in any one row among the parasitic radiators arranged in the 1 column to operate in any one of any two previously divided frequency bands within the frequency range (e.g., 962 MHz to 1213 MHz) for use of the TACAN antenna.

For example, a first frequency band of the two previously divided frequency bands may be set to a frequency band (referred to as "High band") close to 1213 MHz, and a second frequency band may be set to a frequency band (referred to as "Low band") close to 962 MHz. Further, 16 parasitic radiators arranged in the inner row of the 2 rows on the first area may operate in the High band, and 16 parasitic radiators arranged in the outer row may operate in the Low band. Herein, the 16 parasitic radiators arranged in the inner row may have a shorter length than the 16 parasitic radiators arranged in the outer row.

For reference, a parasitic radiator needs to have a length of $\lambda/2$ or more in order to operate as a reflector. Therefore, if the parasitic radiators arranged in 2 rows and 16 columns on the first area as described above have different lengths for each row, all the broad bands of the TACAN antenna can be covered efficiently.

Herein, the controller 150 may control a parasitic radiator to operate as a reflector among multiple parasitic radiators to be changed in the clockwise direction according to a sequence of arrangement on the first area. Further, the controller 150 may control the change to be performed every $\frac{1}{15}$ second. Furthermore, the controller 150 may control parasitic radiators arranged in any row among parasitic radiators arranged in the same column to operate as reflectors and the other parasitic radiators to operate as directors depending on a frequency band.

Under the control of the controller 150 as such, a sequence of some parasitic radiators to operate as reflectors on the first area is electrically rotated at every predetermined timing. Therefore, a signal radiated from the monopole antenna 120 is spread to a space in a 15 Hz amplitude-modulated radiation pattern as shown in FIG. 7.

<Generation of 135 Hz Amplitude-Modulated Radiation Pattern>

Figure 8:
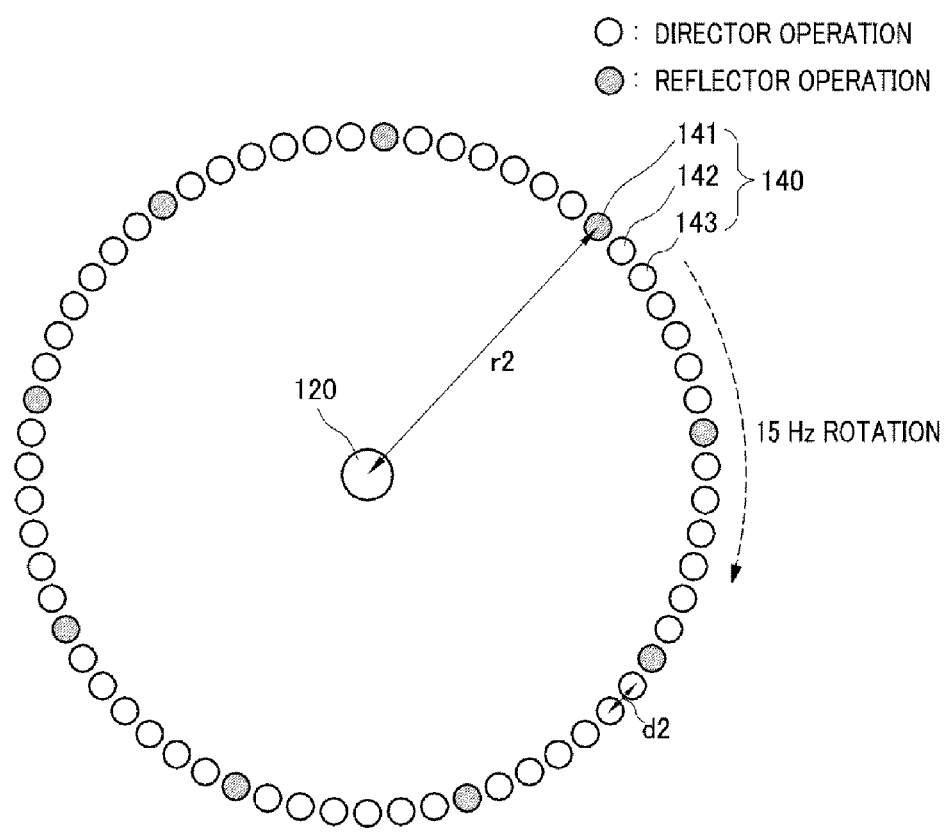
FIG. 8 is a diagram provided to explain an example in which parasitic radiators are arranged on a second concentric circle around a location of a monopole antenna.
Figure 9:
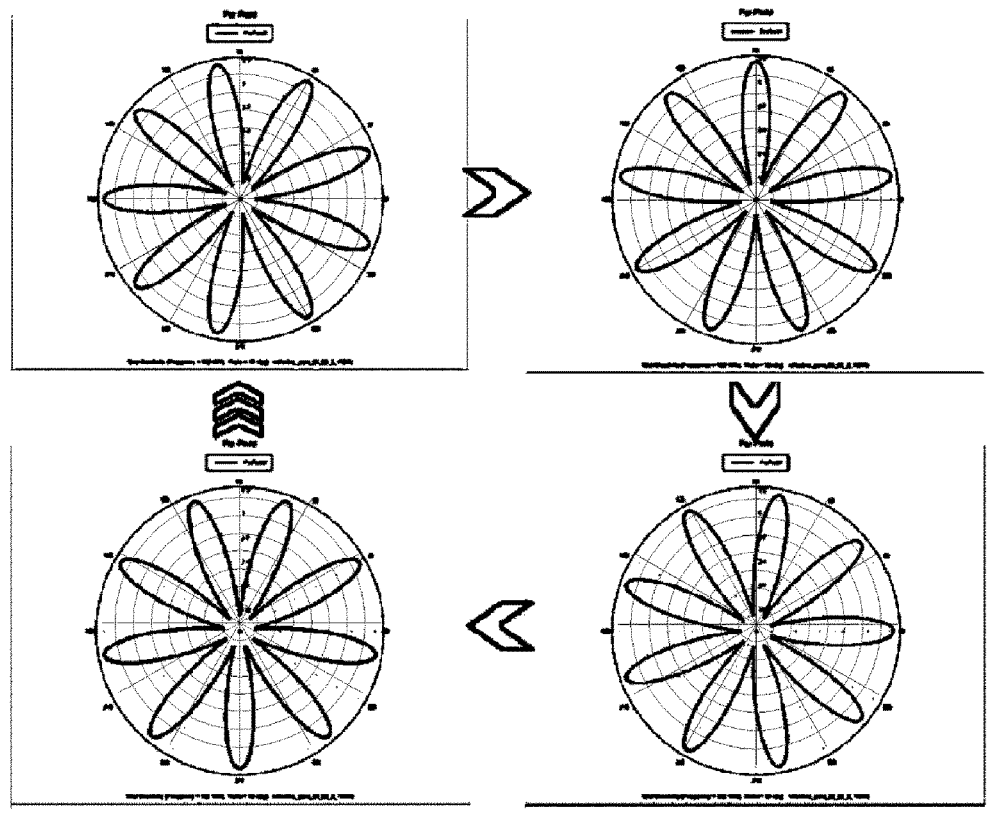
FIG. 9 is a diagram showing a radiation pattern caused by a change of a parasitic radiator that reflects a signal among the parasitic radiators illustrated in FIG. 8.

FIG. 8 is a diagram provided to explain an example in which parasitic radiators are arranged on a second concentric circle around a location of a monopole antenna, and FIG. 9 is a diagram showing radiation patterns caused by a change of some parasitic radiators that reflect a signal among the parasitic radiators illustrated in FIG. 8.

According to an exemplary embodiment, as shown in FIG. 8, 63 parasitic radiators 140 are circularly arranged at a predetermined distance d2 from each other on a line of the second concentric circle. Herein, the second concentric circle has a center with the location of the monopole antenna 120 and has a radius r2. For reference, the radius r2 of the second concentric circle is longer than the radius r1 of the first concentric circle.

FIG. 8 illustrates that 9 parasitic radiators including a first parasitic radiator 141 among the multiple parasitic radiators 140 operate as reflectors to reflect a signal radiated from the monopole antenna 120 and the other parasitic radiators 140 including second and third parasitic radiators 142 and 143 operate as directors to direct the signal. Herein, the 9 parasitic radiators operating as reflectors are spaced at a predetermined distance from each other.

That is, if 63 parasitic radiators 140 are arranged on the second concentric circle, 9 parasitic radiators of them may reflect the signal and the other 54 parasitic radiators may direct the signal.

Herein, the controller 150 may control 9 parasitic radiators to operate as reflectors to be changed in the clockwise direction according to a sequence of arrangement on the second concentric circle. Further, the controller 150 may control the change to be performed every $\frac{1}{15}$ second.

For example, as illustrated in FIG. 8, the controller 150 controls a total of 9 parasitic radiators including the first parasitic radiator 141 operating as reflectors to operate as directors. Also, the controller 150 controls a total of 9 parasitic radiators including the second parasitic radiator 142 arranged subsequent to the 9 parasitic radiators in the clockwise direction on the second concentric circle among the parasitic radiators operating as directors to operate as reflectors. Further, the controller 150 may control some parasitic radiators among the parasitic radiators 140 to be changed to directors or reflectors at a predetermined timing t3. Furthermore, the controller 150 may control the 9 parasitic radiators including the second parasitic radiator 142 to operate as directors and also control a total of 9 parasitic radiators subsequently arranged in the clockwise direction and including the third parasitic radiator 143 to operate as reflectors at a subsequent timing t4.

Under the control of the controller 150 as such, a sequence of some parasitic radiators to operate as reflectors is electrically rotated at every predetermined timing. Therefore, a signal radiated from the monopole antenna 120 has a 135 Hz amplitude-modulated radiation pattern as shown in FIG. 9.

According to another exemplary embodiment, 189 parasitic radiators 140 may be circularly arranged at a predetermined distance from each other on the donut-shaped second area having concentricity with the location of the monopole antenna 120. Herein, the second area may be farther spaced from the monopole antenna 120 than the first area. In particular, 63 pairs of the parasitic radiator 140 may be arranged in 3 rows on the second area. Each parasitic radiator 140 may have a different length and a different radiation pattern depending on a row in which the parasitic radiator 140 is arranged.

Herein, the controller 150 may control parasitic radiators arranged in 9 columns and operating as directors among the parasitic radiators arranged in 3 rows on the second area to operate as reflectors at every predetermined timing. Herein, the parasitic radiators arranged in 9 columns may be equally spaced from each other. Further, the controller 150 may control parasitic radiators arranged in any one row among the parasitic radiators arranged in the 9 columns to operate in any one of any three previously divided frequency bands within the frequency range (e.g., 962 MHz to 1213 MHz) for use of the TACAN antenna.

For example, 63 parasitic radiators arranged in the innermost row of the 3 rows operate in the High band (e.g.: set to the frequency band close to 1213 MHz), and each parasitic radiator may have the smallest length among the parasitic radiators in the 3 rows. Further, 63 parasitic radiators arranged in the outermost row of the 3 rows operate in the Low band (e.g.: set to the frequency band close to 962 MHz), and each parasitic radiator may have the greatest length among the parasitic radiators in the 3 rows. Furthermore, 63 parasitic radiators arranged in the middle row of the 3 rows operate in a Middle band (e.g.: set to a frequency band between 962 MHz and 1213 MHz), and each parasitic radiator may have a middle length between the length of the parasitic radiators in the innermost row of the 3 rows and the length of the parasitic radiators in the outermost row.

For reference, a parasitic radiator needs to have a length of λ/2 or more in order to operate as a reflector. Therefore, if the parasitic radiators arranged in 2 rows and 16 columns on the second area as described above have different lengths for each row, all the broadbands of the TACAN antenna can be covered efficiently.

Under the control of the controller 150 as such, parasitic radiators to operate as reflectors are changed in the clockwise direction according to a sequence of arrangement on the second area. The controller 150 may control the change to be performed every ¹⁄₁₅ second. Further, parasitic radiators arranged in any row among parasitic radiators arranged in the same column on the second area may operate as reflectors and the other parasitic radiators may operate as directors depending on a frequency band.

That is, under the control of the controller 150, a sequence of some parasitic radiators to operate as reflectors on the second area is electrically rotated at every predetermined timing. Therefore, a signal radiated from the monopole antenna 120 is spread to a space in a 135 Hz amplitude-modulated radiation pattern with 9 lobes as shown in FIG. 9.

<Generation of 15 Hz and 135 Hz Amplitude-Modulated Composite Radiation Pattern>

Figure 10:
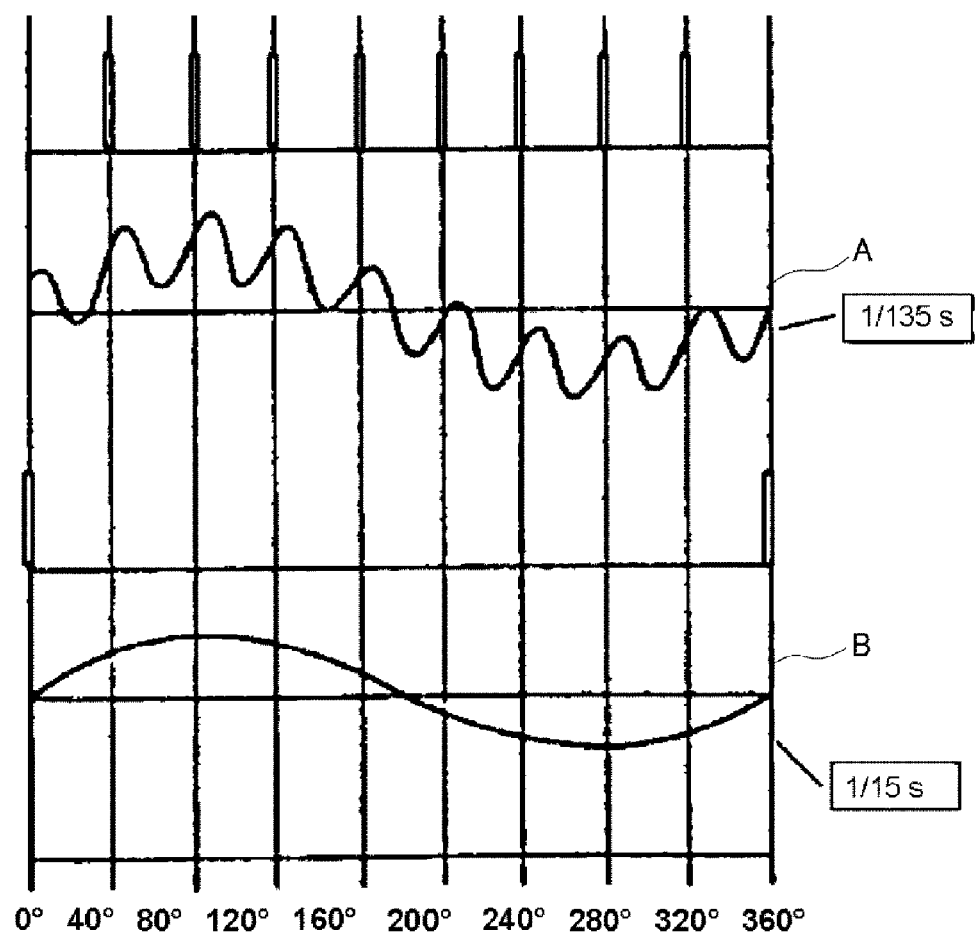
FIG. 10 is a diagram showing a graph relevant to a timing of a change of a parasitic radiator that reflects a signal.

The electrically scanned TACAN antenna 100 according to an exemplary embodiment of the present disclosure may generate a 15 Hz and 135 Hz amplitude-modulated composite radiation pattern through the respective operations of the above-described components. In order to do so, as illustrated in FIG. 10, the controller 150 optimizes a timing B of electrical rotation of some parasitic radiators among the parasitic radiators 130 for 15 Hz amplitude modulation and a timing A of electrical rotation of some parasitic radiators among the parasitic radiators 140 for 135 Hz amplitude modulation. FIG. 10 is a graph showing a timing of a change in a sequence of some parasitic radiators that reflect a signal.

Figure 11:
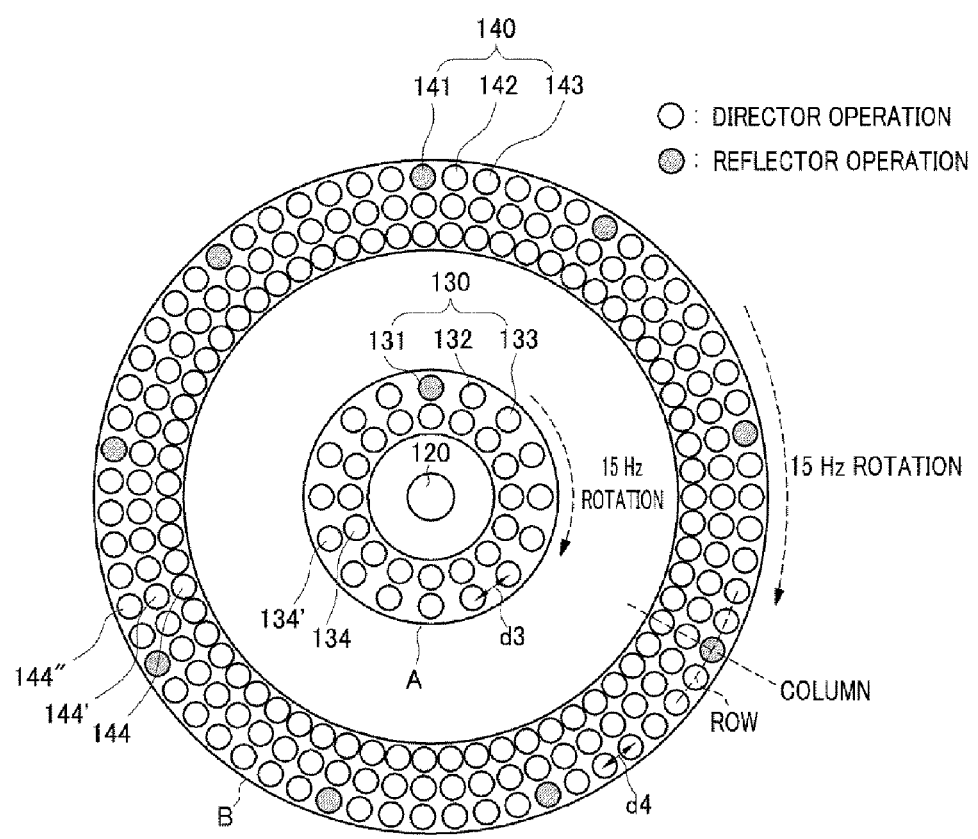
FIG. 11 is a diagram provided to explain an example in which parasitic radiators are arranged on each of a first area and a second area having concentricity with a location of a monopole antenna.
Figure 12:
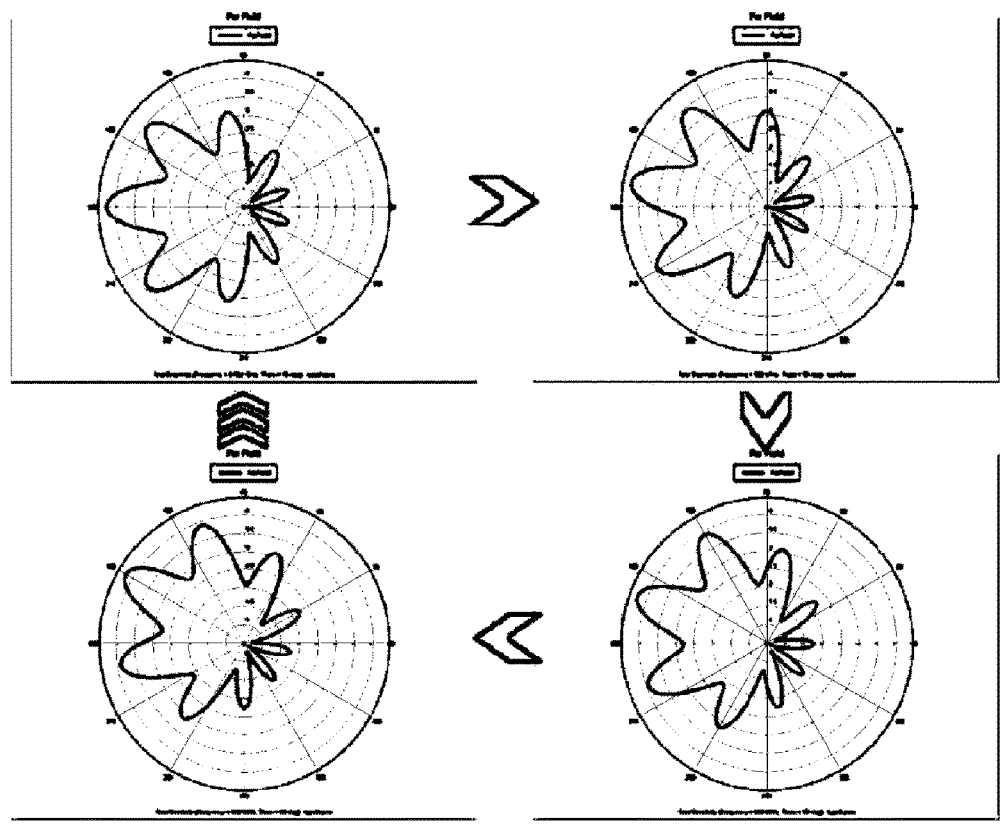
FIG. 12 is a diagram showing a composite radiation pattern caused by a change of a parasitic radiator that reflects a signal among the parasitic radiators illustrated in FIG. 11.

Meanwhile, FIG. 11 is a diagram provided to explain an example in which parasitic radiators are arranged on each of a first area and a second area having concentricity with a location of a monopole antenna, and FIG. 12 is a diagram showing composite radiation patterns caused by a change of some parasitic radiators that reflect a signal among the parasitic radiators illustrated in FIG. 11.

As illustrated in FIG. 11, the multiple parasitic radiators 130 and 140 are circularly arranged on donut-shaped first area A and second area B having concentricity with the location of the monopole 120. Herein, the multiple parasitic radiators 130 on the first area A are arranged at a predetermined distance d3 from each other, and the multiple parasitic radiators 140 on the second area B are arranged at a predetermined distance d4 from each other. The second area B may be farther spaced from the monopole antenna 120 than the first area A.

For example, as illustrated in FIG. 11, each of the parasitic radiator 131 on the first area A and 9 parasitic radiators including the parasitic radiator 141 on the second area B operates as a reflector that reflects a signal radiated from the monopole 120. Further, each of the other parasitic radiators including parasitic radiators 132, 133, and 134 on the first area A and the other parasitic radiators including parasitic radiators 142, 143, and 144 on the second area B operates as a director that directs the signal.

That is, as illustrated in FIG. 11, if 16 pairs of the parasitic radiators 130 are arranged in 2 rows on the first area A and 63 pairs of the parasitic radiators 140 are arranged in 3 rows on the second area B, a parasitic radiator in any row in any one column on the first area A reflects the signal, and each of parasitic radiators in any row in any 9 columns equally spaced from each other on the second area B reflects the signal. Further, each of the other parasitic radiators directs the signal. Furthermore, the parasitic radiators operating as reflectors on the first area A and the second area B are changed in the clockwise direction according to sequences of arrangement on the first area A and the second area B, respectively. Further, the change may be performed every ¹⁄₁₅ second by the controller 150.

Figure 13:
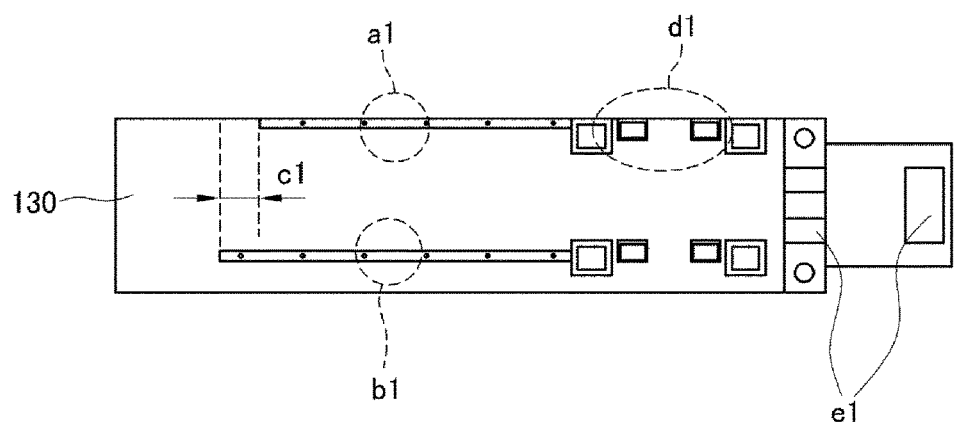
FIG. 13 is a diagram showing an example in which parasitic radiators are arranged in 2 rows on the first area illustrated in FIG. 11.

FIG. 13 is a diagram showing an example in which parasitic radiators are arranged in 2 rows on the first area illustrated in FIG. 11.

As for the parasitic radiators 130 arranged on the first area A, each parasitic radiator may be implemented on a separate PCB, so that parasitic radiators arranged in 2 rows may be divided by the separate PCB as shown in FIG. 11. Otherwise, 2 parasitic radiators a1 and b1 may be implemented on a single PCB as shown in FIG. 13. Herein, a method for implementing parasitic radiators in 2 rows on a PCB is not particularly limited.

Even if 16 pairs of the parasitic radiators 130 arranged in 2 rows on the first area A are arranged in the same column, each parasitic radiator may have a different length and a different radiation pattern depending on a row in which the parasitic radiator is arranged. Herein, the controller 150 may control parasitic radiators arranged in 1 column and operating as directors among the parasitic radiators arranged in 2 rows on the first area A to operate as reflectors at every predetermined timing, and also control a parasitic radiator arranged in any one row among the parasitic radiators arranged in the 1 column to operate in any one of two previously divided frequency bands within the frequency range (e.g.: 962 MHz to 1213 MHz) for use of the TACAN antenna.

For example, 16 parasitic radiators a1 arranged in the inner row on the first area illustrated in FIG. 13 operate in the High band (e.g.: set to the frequency band close to 1213 MHz), and 16 parasitic radiators b1 arranged in the outer row operate in the Low band (e.g.: set to the frequency band close to 962 MHz). Herein, the parasitic radiators a1 and the parasitic radiators b1 may have a difference of c1 in length.

Referring to FIG. 11, the controller 150 may control each parasitic radiator such that parasitic radiators 134' arranged in the outer row among parasitic radiators arranged in the same column on the first area A operate as reflectors and parasitic radiators 134 arranged in the inner row operate as directors depending on a previously divided frequency band.

Herein, the parasitic radiators operating as reflectors are changed in the clockwise direction according to a sequence of arrangement on the first area A, and the change may be electrically performed every ¹⁄₁₅ second by the controller 150.

To be specific, referring to FIG. 13, the controller 150 may control a forward bias to be applied to a PIN diode d1 connected to some parasitic radiators operating as directors among parasitic radiators arranged in the same column on the first area A and a backward bias to be applied to the PIN diode d1 connected to a parasitic radiator operating as a reflector at every predetermined timing.

To be more specific, the controller 150 may include multiple switching elements each connected to the PIN diode d1, and may use the switching elements to switch a bias to be applied to the PIN diode d1 at every predetermined timing. A field effect transistor (FET) may be used as a switching element.

In addition, as described above, the connector which can be connected to or disconnected from one end of the PCB may be provided and fixed to the upper surface of the reflection plate 110. A portion e1 illustrated in FIG. 13 may be conveniently connected to or disconnected from the connector.

Figure 14:
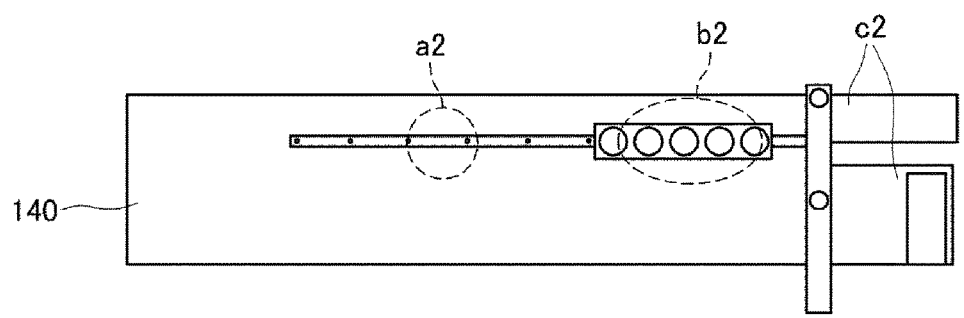
FIG. 14 is a diagram showing an example in which parasitic radiators are arranged in 3 rows on the second area illustrated in FIG. 11.

FIG. 14 is a diagram showing an example in which parasitic radiators are arranged in 3 rows on the second area illustrated in FIG. 11.

As for the parasitic radiators 140 arranged on the second area B, each parasitic radiator may be implemented on a PCB, so that parasitic radiators arranged in 3 rows may be divided or 3 parasitic radiators may be implemented on a single PCB, so that parasitic radiators arranged in 3 rows may be divided, as shown in FIG. 11 and FIG. 14, respectively. Herein, a method for implementing parasitic radiators in 3 rows on a PCB is not particularly limited.

Even if 63 pairs of the parasitic radiators 140 arranged in 3 rows on the second area B are arranged in the same column, each parasitic radiator may have a different length and a different radiation pattern depending on a row in which the parasitic radiator is arranged. Herein, the controller 150 may control parasitic radiators arranged in 9 columns and operating as directors equally spaced from each other among the parasitic radiators arranged in 3 rows on the second area B to operate as reflectors at every predetermined timing, and also control parasitic radiators arranged in any one row among the parasitic radiators arranged in the 9 columns to operate in any one of three previously divided frequency bands within the frequency range (962 MHz to 1213 MHz) for use of the TACAN antenna.

For example, FIG. 14 illustrates that any one parasitic radiator a2 among 63 parasitic radiators arranged in the innermost row on the second area illustrated in FIG. 11 is implemented on a PCB. Herein, the parasitic radiator a2 in the innermost row has a smaller length than parasitic radiator in the other rows and operates in a High band (e.g.: a previously divided frequency band close to 1213 MHz). Further, each of 63 parasitic radiators arranged in the outermost row on the second area illustrated in FIG. 11 may be implemented on a separate PCB. The parasitic radiators in the outermost row have the greater length than parasitic radiator in the other rows and operate in a Low band (e.g.: a previously divided frequency band close to 962 MHz). Furthermore, each of 63 parasitic radiators arranged in the middle row on the second area illustrated in FIG. 11 may be implemented on a separate PCB, have a middle length between the length of the parasitic radiators in the innermost row and the length of the parasitic radiators in the outermost row, and operate in a Middle band (a frequency band between 962 MHz and 1213 MHz). However, in some cases, all of the parasitic radiators in 3 rows may be implemented on a single PCB Referring to FIG. 11, the controller 150 may control each parasitic radiator such that parasitic radiators 144" arranged in the outermost row among parasitic radiators arranged in the same column on the second area B operate as reflectors and parasitic radiators 144 arranged in the innermost row and parasitic radiators 144' arranged in the middle row operate as directors depending on a previously divided frequency band.

Herein, the parasitic radiators operating as reflectors are changed in the clockwise direction according to a sequence of arrangement on the second area B, and the change may be electrically performed every 1/15 second by the controller 150.

To be specific, referring to FIG. 14, the controller 150 may perform switching at every predetermined timing in order for a forward bias to be applied to a PIN diode b2 connected to some parasitic radiators and a backward bias to be applied to a PIN diode connected to a parasitic radiator operating as a reflector. A switching element such as a FET may be used for the switching.

Further, a portion c2 of the PCB illustrated in FIG. 14 may be conveniently connected to or disconnected from the connector provided on the upper surface of the above-described reflection plate 110.

Under the control of the controller 150 as described above, some parasitic radiators to operate as reflectors among the multiple parasitic radiators 130 and 140 are electrically rotated. Therefore, a signal radiated from the monopole antenna 120 is spread to a space in a 15 Hz and 135 Hz amplitude-modulated composite (or overlap) radiation pattern as shown in FIG. 15.

Figure 15:
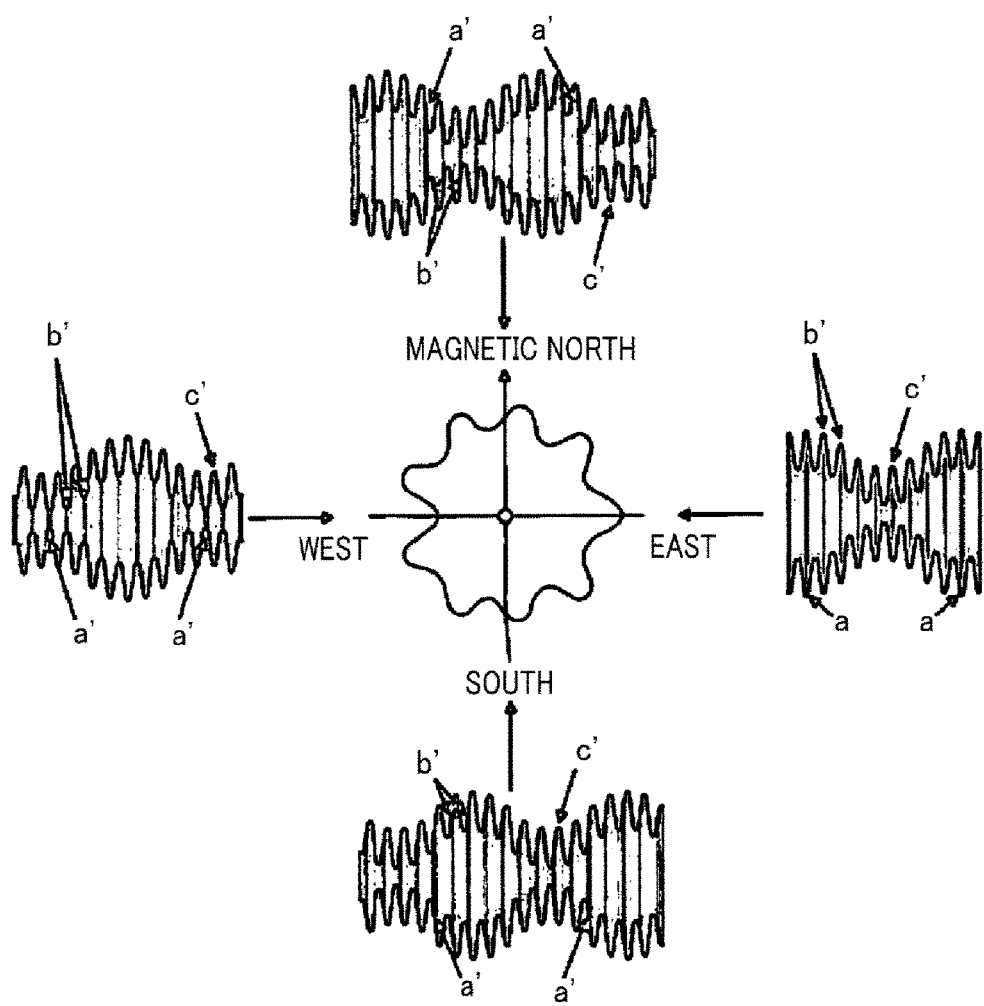
FIG. 15 is a diagram showing 15 Hz and 135 Hz amplitude-modulated composite radiation patterns.

FIG. 15 is a diagram showing 15 Hz and 135 Hz amplitude-modulated composite radiation patterns.

If an airplane is located in the due north (magnetic north), east, south, and west of a TACAN antenna located at a ground station, phases of a composite radiation pattern signal appear as shown in FIG. 15. Herein, the airplane may receive the composite radiation pattern signal and calculate phase angle information. Herein, a' represents north reference bursts; b' represents 8 auxiliary reference bursts for each pattern rotation, and c' represents 15 Hz and 135 Hz amplitude modulation.

<Operation Between Parasitic Radiator and Controller>

Figure 16:
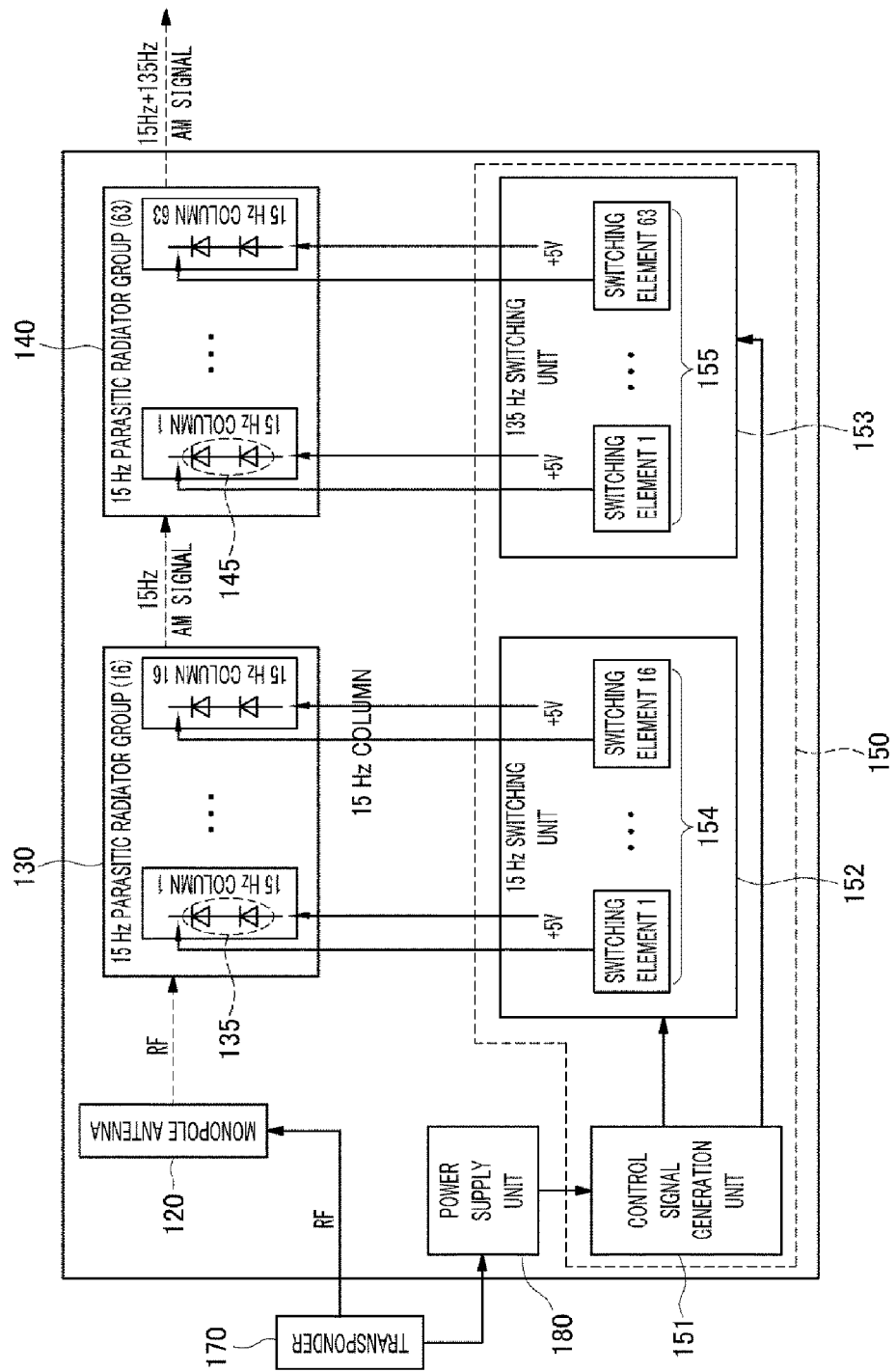
FIG. 16 is a diagram provided to explain a connection relationship of multiple parasitic radiators and a controller and an exemplary operation thereof.

FIG. 16 is a diagram provided to explain a connection relationship of multiple parasitic radiators and a controller and an exemplary operation thereof.

The monopole antenna 120 receives a RF signal from a TACAN transponder 170 and omnidirectionally radiates the received RF signal.

The controller 150 includes a control signal generation unit 151, a 15 Hz switching unit 152, and a 135 Hz switching unit 153. The control signal generation unit 151 is applied with power from a power supply unit 180 and transfers an On/Off signal to multiple switching elements 154 within the 15 Hz switching unit 152 and also transfers an On/Off signal to multiple switching elements 155 within the 135 Hz switching unit 153. The multiple switching elements 154 and 155 may be implemented with FET or the like, and are respectively connected to the multiple parasitic radiators 130 and 140.

A 15 Hz parasitic radiator group may include 16 parasitic radiators 130 circularly arranged around the monopole antenna 120 and a diode 135 and generate a 15 Hz amplitude-modulated radiation pattern depending on a switching operation of the controller 150.

A 135 Hz parasitic radiator group may include 63 parasitic radiators 140 circularly arranged around the monopole antenna 120 and having a longer radius than the 16 parasitic radiators 130 and a diode 145 and generate a 15 Hz and 135 Hz amplitude-modulated composite (overlap) radiation pattern depending on a switching operation of the controller 150.

As described above, the multiple parasitic radiators 130 and 140 may be circularly arranged at predetermined spaces on the respective donut-shaped first area and second area having concentricity with the location of the monopole 120 and may generate a 15 Hz and 135 Hz amplitude-modulated composite (overlap) radiation pattern according to the same principle.

To be more specific, in a state where a bias of +5 V is constantly applied to an anode of a PIN diode, if 0 V as a backward bias is applied to a cathode, the PIN diode is electrically connected. Thus, the parasitic radiator connected to the reflection plate 110 operates as a reflector. Further, if +100 V as a forward bias is applied to the cathode, the PIN diode is electrically disconnected. Thus, the parasitic radiator disconnected from the reflection plate 110 operates as a director.

If a FET is used as a switching element, the control signal generation unit 151 may supply an On/Off signal as a gate signal of the FET at every predetermined timing (e.g., a cycle of 15 Hz).

If the above-described electrically scanned TACAN antenna according to each exemplary embodiment of the present disclosure is used, it is possible to semipermanently and accurately generate an amplitude-modulated composite (overlap) signal unlike a mechanically scanned TACAN antenna using a motor and also possible to achieve advantages such as no noise, no vibration, and saving of maintenance cost.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An electrically scanned TACAN antenna comprising:
a reflection plate;
a monopole antenna provided on an upper surface of the reflection plate and configured to omnidirectionally radiate a signal;
multiple parasitic radiators arranged around the monopole antenna and configured to operate as reflectors that reflect the signal or directors that direct the signal; and
a controller configured to control parasitic radiators operating as the reflectors to operate as the directors and some parasitic radiators among parasitic radiators operating as the directors to operate as the reflectors at every predetermined timing and choose the some parasitic radiators to be changed according to a preset sequence, and
wherein the parasitic radiators are circularly arranged at a predetermined distance from each other on donut-shaped first area and second area having concentricity with a location of the monopole antenna, and the second area is farther spaced from the monopole antenna than the first area,
wherein 16 parasitic radiators arranged in each of 2 rows on the first area have different lengths and different radiation patterns depending on a row in which the parasitic radiators are arranged, and 63 parasitic radiators arranged in each of 3 rows on the second area have different lengths and different radiation patterns depending on a row in which the parasitic radiators are arranged,
wherein the controller is configured to control parasitic radiators arranged in 1 column operating as the directors among the 16 parasitic radiators arranged in each of 2 rows to operate as the reflectors, and control a parasitic radiator arranged in any one row among the parasitic radiators arranged in the 1 column to operate in any one of two previously divided frequency bands within a preset frequency range for use of TACAN antenna, and
the controller is configured to control parasitic radiators arranged in 9 columns operating as the directors equally spaced from each other among the 63 parasitic radiators arranged in each of 3 rows to operate as the reflectors, and control parasitic radiators arranged in any one row among the parasitic radiators arranged in the 9 columns to operate in any one of three previously divided frequency bands within a preset frequency range for use of TACAN antenna.

2. The electrically scanned TACAN antenna of claim 1, wherein the reflection plate has a circular plate shape, and the monopole antenna is arranged at the center of the circular plate.

3. The electrically scanned TACAN antenna of claim 1, wherein the controller is configured to control the parasitic radiators arranged in the 1 column on the first area and the parasitic radiators arranged in the 9 columns on the second area to operate as the reflector every $\frac{1}{15}$ second, and
the controller is configured to control the parasitic radiators arranged in the 1 column to be changed in a clockwise direction according to a sequence of arrangement on the first area and the parasitic radiators arranged in the 9 columns to be changed in the clockwise direction according to a sequence of arrangement on the second area.

4. The electrically scanned TACAN antenna of claim 1, wherein each of the parasitic radiators is implemented on a PCB, and
on the upper surface of the reflection plate, a connector which is connected to or disconnected from one end of the PCB is provided and fixed.

5. The electrically scanned TACAN antenna of claim 1, wherein the controller is configured to control a forward bias to be applied to a PIN diode connected to some parasitic radiators operating as the directors and a backward bias to be applied to a PIN diode connected to a parasitic radiator operating as the reflector.

6. The electrically scanned TACAN antenna of claim 5, wherein the controller includes multiple switching elements each connected to the PIN diode, and
the controller is configured to switch a bias to be applied to the PIN diode at every predetermined timing by using the switching elements.

* * * * *